Figure 1:
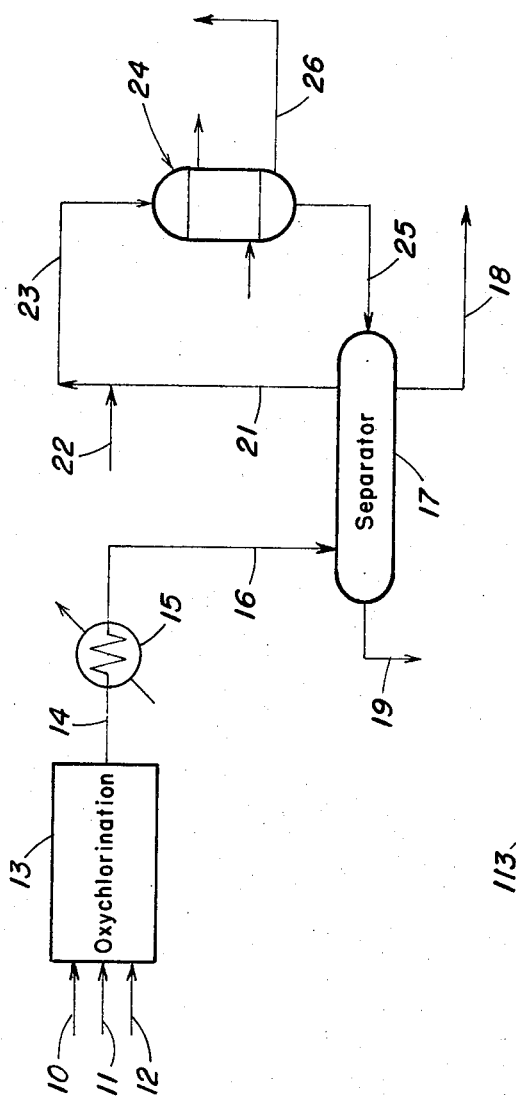

United States Patent [19]
Tsao

[11] 3,793,801
[45] Feb. 26, 1974

[54] RECOVERY OF CHLORINATED HYDROCARBON

[75] Inventor: Utah Tsao, Jersey City, N.J.

[73] Assignee: The Lummus Compant, Bloomfield, N.J.

[22] Filed: Sept. 28, 1972

[21] Appl. No.: 292,915

[52] U.S. Cl. .......................................... 55/71, 55/82
[51] Int. Cl. ............................................ B01d 53/00
[58] Field of Search .................................. 55/71, 82

[56] References Cited
UNITED STATES PATENTS
2,528,028  10/1950  Barry ................................ 55/82 X
2,852,517  9/1958  Lynn .................................. 55/82 X FOREIGN PATENTS OR APPLICATIONS
675,038  7/1952  Great Britain ...................... 55/82

Primary Examiner—John Adee
Attorney, Agent, or Firm—Marn & Jangarathis; Louis E. Marn; Elliot M. Olstein

[57] ABSTRACT

A chlorinated hydrocarbon, such as dichloroethane, is recovered from an oxychlorination reaction effluent by cooling the effluent to condense chlorinated hydrocarbon and water, combining the remaining gas with hydrogen chloride in an amount to produce, in the subsequent cooling step, an aqueous hydrogen chloride condensate which does not freeze, and cooling the combined stream to condense remaining chlorinated hydrocarbon and aqueous hydrogen chloride.

11 Claims, 2 Drawing Figures

RECOVERY OF CHLORINATED HYDROCARBON

This invention relates to the recovery of chlorinated hydrocarbons, and more particularly to a new and improved process for recovering chlorinated hydrocarbons from a water containing gaseous stream.

In many operations, a chlorinated hydrocarbon is to be recovered from a gaseous stream which also includes water vapor.

In the oxychlorination of, for example, $C_2$ hydrocarbons; i.e., ethane and/or ethylene, the reaction effluent includes water, dichloroethane and non-condensible gas; i.e., generally carbon oxides and nitrogen introduced with the air which provides the oxygen requirements for the process, and in order to effect a high recovery of chlorinated hydrocarbons, the effluent must be cooled to 0°F. or less. The presence of water in the effluent presents a problem in that at such temperatures water freezes. In some cases, the oxychlorination is effected with an excess of hydrogen chloride in that the presence of such an excess depresses the freezing point of the water condensed from the effluent thereby preventing freezing of water at the temperature employed during the recovery. The use of such an excess of hydrogen chloride, however, reduces the overall yields of chlorinated hydrocarbons from hydrogen chloride.

An object of the present invention is to provide an improved oxychlorination process.

Another object of the present invention is to provide for an improved recovery of chlorinated hydrocarbons from an oxychlorinator reaction effluent.

Figure 2:
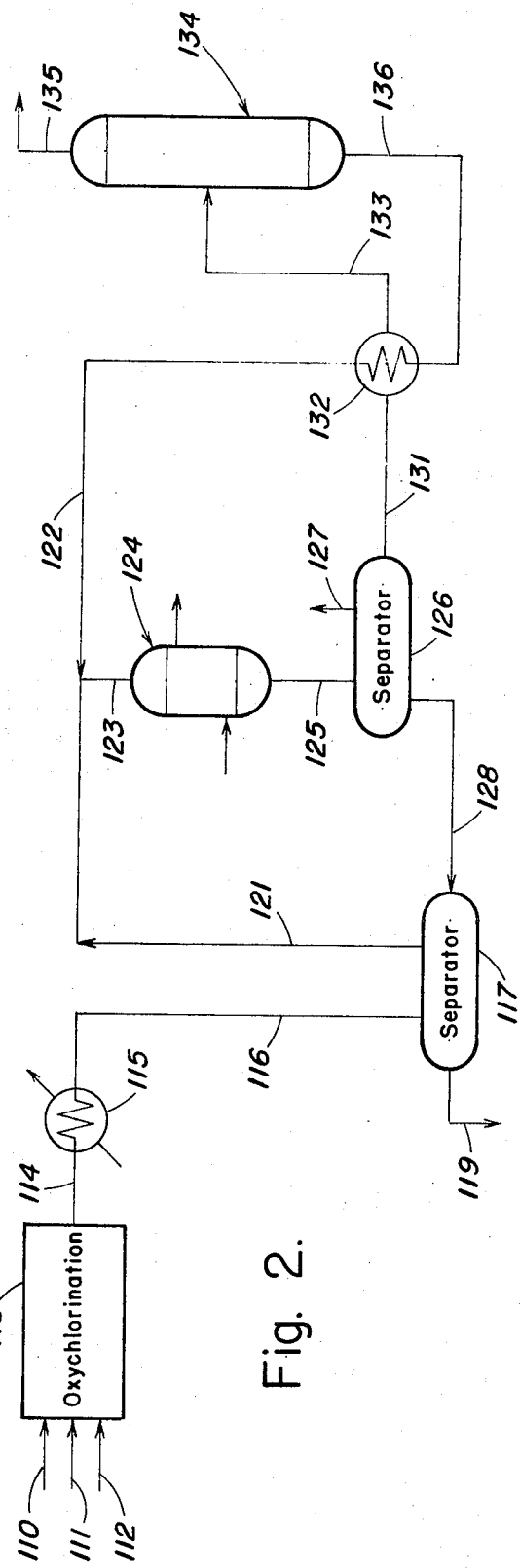

These and other objects of the present invention should be more readily apparent from reading the following detailed description of the invention with reference to the accompanying drawings wherein:

FIG. 1 is a simplified schematic flow diagram of an embodiment of the present invention; and FIG. 2 is a simplified schematic flow diagram of a modification of the embodiment of FIG. 1.

The objects of the present invention are broadly accomplished in one aspect by cooling a gaseous stream including at least one chlorinated hydrocarbon and water vapor to a temperature at which a major portion of the chlorinated hydrocarbon product is condensed from the gas, the aforesaid temperature being above the freezing point of water, which is also condensed from the effluent. The condensed portion is recovered and the remaining effluent, including water vapor and some chlorinated hydrocarbon, is combined with hydrogen chloride (either anhydrous or aqueous hydrogen chloride and the term "hydrogen chloride" as used herein refers to both anhydrous and aqueous hydrogen chloride); the hydrogen chloride being added in an amount such that in the subsequent cooling to a temperature below the freezing temperature of water to condense the remaining portion of the chlorinated hydrocarbon product, the water which is also condensed, will condense as an aqueous hydrogen chloride solution which has a freezing point below the temperature employed for effecting the condensation. In this manner, the chlorinated hydrocarbon can be recovered from the gaseous stream without water freezing.

In accordance with a particularly preferred embodiment of the present invention, the remaining gaseous stream, including the additionally added hydrogen chloride to depress the freezing point of water condensed therefrom, is passed downwardly through a cooling zone, to condense the chlorinated hydrocarbon and water, as an aqueous hydrogen chloride solution. It has been found that the downward passing of the stream, during the cooling, increases the overall efficiency of the process as opposed to an upflow cooling. Thus, for example, in an upflow cooling process, as compared to downflow cooling, greater amounts of hydrogen chloride are required in order to prevent freezing of water.

The process of the present invention is particularly suitable for recovering chlorinated hydrocarbon(s) from an oxychlorination reaction effluent.

The process for oxychlorinating hydrocarbons, both saturated and unsaturated, is well-known in the art. In general, the hydrocarbon to be oxychlorinated is contacted with hydrogen chloride and molecular oxygen (the molecular oxygen is generally provided as air or oxygen enriched air) in the presence of an oxychlorination reaction catalyst either supported or unsupported, as a solid or melt; generally the chloride of a multivalent metal, in particular the chlorides of copper and iron, at a temperature from about 450°F. to about 750°F. to produce chlorinated hydrocarbons. The oxygen and hydrocarbon are mixed in proportions, as known in the art, to avoid explosive mixtures, and as a result of the reaction between the hydrocarbon, hydrogen chloride and oxygen, the hydrocarbon is oxychlorinated to corresponding chlorinated hydrocarbons. The details of the oxychlorination of various hydrocarbons are well-known in the art and, accordingly, no detailed description thereof is deemed necessary for a full understanding of the invention. It is to be understood, however, that in accordance with the present invention, the oxychlorination is preferably effected with a deficiency of hydrogen chloride in that an excess of hydrogen chloride is no longer required for the subsequent separation steps.

The oxychlorination reaction effluent, including the chlorinated hydrocarbons and water, as reaction product, in addition to non-condensibles, such as carbon oxides (carbon dioxide and/or carbon monoxide) resulting from combustion of hydrocarbon feed in the oxychlorination reaction zone and nitrogen, is cooled to a temperature (above the freezing point of water; i.e., 32°F.) at which a major portion of the chlorinated hydrocarbon products is condensed from the effluent. The lower the temperature to which the effluent is cooled, the greater the amount of chlorinated hydrocarbon and water which is condensed from the effluent and the choice of the particular temperature is deemed to be within the scope of those skilled in the art. In general, the effluent is cooled to a temperature which is at about 140°F. to about 40°F. In general, from about 85 percent to about 95 percent of the chlorinated hydrocarbons contained in the effluent are condensed during the initial cooling step at the prevailing pressure, generally a pressure from about 2 atm. to about 10 atm.

The condensate, comprised of chlorinated hydrocarbons and water, is separated from the remainder of the reaction effluent comprised of non-condensible gas, remaining chlorinated hydrocarbon product and water, and the remainder of the effluent is combined with hydrogen chloride. The hydrogen chloride is added to the effluent, as a freezing point depressant for water, in order to avoid freezing of water during the subsequent cooling step to a temperature below the freezing point of water and above the freezing point of the chlorinated hydrocarbon for recovering the remaining chlorinated hydrocarbon from the effluent. The hydrogen chloride is added in an amount which is sufficient to produce, during the subsequent condensation step, an aqueous hydrogen chloride condensate which has a freezing point below the temperature employed in the subsequent cooling step. The temperature employed in the cooling step is selected to provide the desired recovery of remaining chlorinated hydrocarbon at the prevailing pressure (generally a pressure from about 2 atm. to to about 10 atm) and as should be apparent to those skilled in the art the effluent is not cooled to a temperature much below that required to effect the desired recovery in order to minimize refrigeration requirements. In general, the gas remaining subsequent to this cooling step contains less than 1.5 percent and preferably less than 1 percent, by weight, of chlorinated hydrocarbon. In general, the remaining chlorinated hydrocarbon product is condensed from the effluent by cooling the effluent to a temperature from about 25°F. to about −25°F. and more particularly from 0°F. to about −25°F. with the choice of a particular temperature being within the scope of those skilled in the art from the teachings herein. In order to prevent freezing of water during the cooling step at the contemplated temperatures, the hydrogen chloride is added in an amount, which is sufficient to provide, during the cooling which condenses further water reaction product, an aqueous hydrogen chloride solution containing at least about 10 wt. percent hydrogen chloride, and in general an aqueous hydrogen chloride solution containing from about 15 wt. percent to about 25 wt. percent hydrogen chloride. It is to be understood that larger amounts of hydrogen chloride could be employed but of course the preferred operation is to employ the minimum amount of hydrogen chloride required to prevent freezing of water during the subsequent condensation.

In accordance with one embodiment of the invention aqueous hydrogen chloride condensate is recovered, and after suitable adjustment of the concentration (generally the concentration of at least about 20 wt. percent) is employed as the added hydrogen chloride for the recovery of remaining chlorinated hydrocarbon. In accordance with the present invention, the cooling of the remaining effluent, including added hydrogen chloride, is preferably effected by passing the effluent downwardly through the cooling zone in that such a procedure has been found to minimize the amount of hydrogen chloride required for providing the desired freezing point depression. It is to be understood, however, that cooling could be effected by use of an upward flow in the event that the added advantage obtained by the use of downward cooling is not desired.

The invention will be further described with respect to embodiments thereof for the oxychlorination of a $C_2$ hydrocarbon, in particular, ethylene, to produce dichloroethane, in particular, 1,2-dichloroethane, but it is to be understood that the scope of the invention is not to be limited thereby.

Referring now to FIG. 1 of the drawings, ethylene in line 10, hydrogen chloride in line 11 and air in line 12 are introduced into a oxychlorination reaction zone 13, of a type known in the art, wherein the ethylene is oxychlorinated to chlorinated hydrocarbons, primarily 1,2-dichloroethane. The oxychlorination is effected as known in the art, and as hereinabove indicated, preferably with a slight deficiency of hydrogen chloride.

An oxychlorination reaction effluent, including chlorinated hydrocarbon, in particular 1,2-dichloroethane, water, noncondensible gas, in particular carbon oxides and nitrogen, is withdrawn from zone 13 (generally at a temperature from about 400°F. to about 500°F.) through line 14 and passed through cooler 15 wherein the effluent is indirectly cooled to a temperature at which a major portion of the 1,2-dichloroethane is condensed from the effluent along with water. In general, the effluent is cooled in cooler 15 to a temperature from about 140°F. to about 40°F., resulting in condensation of from about 85 percent to about 95 percent of the dichloroethane from the effluent.

The effluent withdrawn from cooler 15, in line 16, is introduced into separator 17 wherein the condensate is separated from the remainder of the gaseous effluent and the condensate separates into organic and aqueous phases. The organic phase comprises of 1,2-dichloroethane is withdrawn from separator 17 through line 18 for further treatment (not shown); for example, the 1,2-dichloroethane may be washed with caustic to remove chloral. An aqueous phase, comprised of dilute hydrogen chloride, as hereinafter described, is withdrawn from separator 17 through line 19 and may be discarded.

The remainder of the gaseous effluent, containing noncondensible gases, 1,2-dichloroethane and water, is withdrawn from separator 17 through line 21 and combined with anhydrous hydrogen chloride in line 22. As hereinabove described, the hydrogen chloride is added in an amount sufficient to provide an aqueous hydrogen chloride condensate which does not freeze at the conditions prevailing during the subsequent cooling step; i.e., the condensate produced in the subsequent cooling step contains at least 15 percent, by weight, hydrogen chloride.

The combined stream in line 23 is passed downwardly through a chiller 24 wherein the stream is indirectly cooled by a suitable coolant to a temperature at which remaining 1,2-dichloroethane is condensed from the effluent. As a result of such cooling, an aqueous solution of hydrogen chloride is also condensed from the effluent. In general, cooling is effected in chiller 24 to a temperature from about 25°F. to about −25°F., at a pressure from about 2 atms. to about 10 atms to effectively condense remaining 1,2-dichloroethane. The condensate of aqueous hydrogen chloride and 1,2-dichloroethane is withdrawn from chiller 24 through line 25 and introduced into separator 17 for separation of the aqueous and organic phases.

A vent gas, comprised essentially of the noncondensible gases from the effluent and perhaps including minor portions of hydrogen chloride and chlorinated hydrocarbon (less than 1.5 percent chlorinated hydrocarbon, preferably less than 1.0 percent chlorinated hydrocarbon) may be vented to the atmosphere, preferably after suitable scrubbing to remove any remaining hydrogen chloride.

The hereinabove described embodiment may be modified in numerous ways within the spirit and scope of the invention. Thus, for example, the cooling in the presence of hydrogen chloride may be effected by upward flow, with the downward flow, as hereinabove described, being preferred. A further modification of the embodiment hereinabove particularly described with reference to FIG. 1 is illustrated in FIG. 2.

Referring now to FIG. 2 of the drawings, as described with respect to the embodiment illustrated in FIG. 1, ethylene in line 110, hydrogen chloride in line 111 and air in line 112 are introduced into a oxychlorination reaciton zone 113, of a type known in the art, wherein the ethylene is oxychlorinated to chlorinated hydrocarbons, primarily 1,2-dichloroethane. The oxychlorination is effected as known in the art, and as hereinabove indicated, preferably with a slight deficiency of hydrogen chloride.

An oxychlorination reaction effluent, including chlorinated hydrocarbon, in particular 1,2-dichloroethane, water, non-condensible gas, in particular carbon oxides and nitrogen, is withdrawn from zone 113 (generally at a temperature from about 400°F. to about 500°F.) through line 114 and passed through cooler 115 wherein the effluent is indirectly cooled to a temperature at which a major portion of the 1,2-dichloroethane is condensed from the effluent along with water. In general, the effluent is cooled in cooler 115 to a temperature from about 140°F. to about 40°F., resulting in condensation of from about 85 percent to about 95 percent of the dichloroethane from the effluent.

The effluent withdrawn from cooler 115, in line 116, is introduced into separator 117 wherein the condensate is separated from the remainder of the gaseous effluent and the condensate separates into organic and aqueous phases. The organic phase comprises of 1,2-dichloroethane is withdrawn from separator 117 through line 118 for further treatment (not shown); for example, the 1,2-dichloroethane may be washed with caustic to remove chloral. An aqueous phase, comprised of dilute hydrogen chloride (unreacted hydrogen chloride), is withdrawn from separator 117 through line 119 and may be discarded.

The remainder of the gaseous effluent, containing noncondensible gases, 1,2-dichloroethane and water, is withdrawn from separator 117 through line 121 and combined with aqueous hydrogen chloride in line 122. The aqueous hydrogen chloride is added in an amount and at a concentration such that the hydrogen chloride concentration subsequent to the cooling step (the cooling also in condensation of reaction product water from the gaseous effluent) is sufficient to prevent freezing at the prevailing temperature and pressure. Thus, for example, the aqueous hydrogen chloride introduced through line 122 may be at a concentration of about 20 wt. percent which becomes diluted during the subsequent cooling by condensed water reaction product to a concentration of about 15 wt. percent The combined stream in line 123 is passed downwardly through a chiller 124 wherein the stream is indirectly cooled by a suitable coolant to a temperature at which remaining 1,2-dichloroethane is condensed from the effluent. In general, cooling is effective in chiller 124 to a temperature from about 25°F. to about −25°F. at a pressure from about 2 atm. to about 10 atm. to effectively condense remaining 1,2-dichloroethane.

The condensate and non-condensed gas is withdrawn from chiller 124 through line 125 and introduced into a separator 126 wherein the condensate is separate from the non-condensed gas and the condensate separates into organic and inorganic phases. A vent gas, comprised essentially of the non-condensible gases and chlorinated hydrocarbon is vented through line 127.

The organic phase comprised of 1,2-dichloroethane is passed from separator 126 to separator 117 through line 128.

The aqueous phase comprised of aqueous hydrogen chloride is withdrawn from separator 126 through line 131 and passed through heat exchanger 132 wherein the aqueous hydrogen chloride is indirectly heated by more concentrated aqueous hydrogen chloride, as hereinafter described. The heated aqueous hydrogen chloride from heat exchanger 132 in line 133 is introduced into a fractionation column, schematically indicated as 134, wherein the aqueous hydrogen chloride is concentrated by removal of water condensed from the oxychlorination reactor product. Thus, for example, the 15 wt. percent hydrogen chloride solution in line 133 may be concentrated in fractionator 134 to a 20 wt. percent hydrogen chloride solution. A water overhead, containing trace amounts of hydrogen chloride is withdrawn from fractionator 134 through line 135.

An aqueous hydrogen chloride bottoms is withdrawn from fractionator 134 through line 136, passed through heat exchanger 132 and employed in line 122, as hereinabove described. It should be apparent that make-up hydrogen chloride acid may be provided to compensate for hydrogen chloride losses.

In accordance with the modified embodiment described with reference to FIG. 2, hydrogen chloride requirements are reduced as a result of recovery of hydrogen chloride used for prevention of freezing during recovery of remaining chlorinated hydrocarbon.

The above modifications and others should be apparent to those skilled in the art from the teachings herein.

It is also to be understood that although the invention has been particularly described with respect to recovery of chlorinated hydrocarbon from an oxychlorination effluent, the present invention is applicable to recovery of chlorinated hydrocarbon from water containing gaseous streams obtained from other sources.

The invention will be further described with respect to the following example, but it is to be understood that the scope of the invention is not to be limited thereby.

EXAMPLE

Referring to FIG. 1 of the drawing, ethylene in line 10 is (146 mols/hr) hydrogen chloride in line 11, (287 mols/hr) and air in line 12, (377 mols/hr) are introduced into oxychlorination reaction zone 13 at about 5.5 atm. wherein the ethylene is oxychlorinated to chlorinated hydrocarbons, primarily 1,2-dichloroethane. The reaction effluent, line 14, is at about 450°F. and 5.5 atm. and has the following typical composition.

| Component | Wt.% |
|---|---|
| Nitrogen | 32.70 |
| Oxygen | 0.73 |
| Carbon Monoxide | 0.13 |
| Carbon Dioxide | 0.38 |
| Ethylene | 0.20 |
| Hydrogen Chloride | 0.35 |
| Ethyl Chloride | 0.80 |
| 1,2-Dichloroethane | 54.20 |
| Chloral | 0.17 |
| 1,1,2 Trichloroethylene | 0.31 |
| Other Chlorinated Hydrocarbons | 0.13 |
| Water | 9.90 |
| | 100.00 |

The effluent is passed through cooler 15 wherein it is cooled to 110°F. at which temperature 89.7 percent of the 1,2-dichloroethane and 96.4 percent of the water are condensed. The unconverted hydrogen chloride is all absorbed in the condensed water. The effluent withdrawn from cooler 15, in line 16, is introduced into separator 17 wherein the condensate is separated from the remainder of the gaseous effluent and the condensate separates into organic and aqueous phases. The organic phase comprised essentially of 1,2-dichloroethane with some other chlorinated hydrocarbons is combined with organic condensate from chiller 24 and withdrawn from separator 17 through line 18 for further treatment.

The remainder of the gaseous effluent containing noncondensible gases, 1,2-dichloroethane, ethyl chloride and water (92 lb/hr) is withdrawn from separator 17 through line 21 and combined with 16 lb/hr of hydrogen chloride in line 22.

The combined stream in line 13 is passed downwardly through a chiller 24 wherein the stream is indirectly cooled to 0°F. at which the temperature 1,2-dichloroethane is condensed from the effluent. As a result of such cooling, water vapor is also condensed and absorbs hydrogen chloride simultaneously to form 16.5 percent hydrochloric acid which has a freezing point of −30°F. The condensate of aqueous hydrogen chloride and 1,2 dichloroethane is withdrawn from chiller 24 through line 25 and introduced into separator 17 for separation of the aqueous and organic phases.

The vent gas comprised essentially of the noncondensible gases from the effluent and including 1.6 wt. percent chlorinated hydrocarbons and a trace of hydrogen chloride is scrubbed with dilute caustic solution and then vented to the atmosphere.

The waste aqueous stream in line 19 is 2,607 lb/hr containing 23 lb/hr 1,2-dichloroethane and 102 lb/hr of hydrogen chloride. To achieve the same 1,2-dichloroethane recovery by feeding excess hydrogen chloride to the oxychlorination reactor and chilling the total effluent to 0°F., the hydrogen chloride in the waste aqueous stream will be 460 lb/hr, which is 4.5 times greater than the waste hydrogen chloride following the teachings of the present invention.

In accordance with the present invention, chlorinated hydrocarbon product is efficiently and effectively recovered from an oxychlorination effluent, without water freezing problems, while minimizing hydrogen chloride requirements. In accordance with the present invention, in recovering 1,2-dichloroethane from an effluent produced by the oxychlorination of ethylene, the hydrogen chloride in the waste stream is from three times to about five times less than the hydrogen chloride which would be present in following the teachings of the prior art in which additional hydrogen chloride is added to the oxychlorination feed.

The reduction of excess hydrogen chloride will reduce the acid in waste water. Thus, the neutralization requirement for waste stream is greatly reduced. The disposal problem of the waste stream is minimized. Furthermore, with the present invention only the uncondensed portion of the reactor effluent is chilled to low temperature and therefore there is a reduction of refrigeration load of about 40 percent.

Numerous modifications and variations of the invention are possible in light of the above teachings and, therefore, within the scope of the appended claims the invention may be practised other than as particularly described.

I claim:

1. A process for recovering a chlorinated hydrocarbon for a gaseous stream, including the chlorinated hydrocarbon and water, comprising:
   a. cooling said gaseous stream to a temperature above the freezing point of water to condense water and a major portion of the chlorinated hydrocarbon;
   b. separating the condensed portion from the remaining gaseous stream;
   c. adding hydrogen chloride to said remaining gaseous stream in an amount sufficient to provide during step (d) a aqueous hydrogen chloride solution which does not freeze at the temperature employed in hereinafter step (d); and
   d. cooling the remaining stream from step (c) to a temperature below the freezing point of water and above the freezing point of the chlorinated hydrocarbon to condense further chlorinated hydrocarbon and water, said condensed water combining with the added hydrogen chloride to provide an aqueous hydrogen chloride solution which is at a temperature above its freezing temperature.

2. The process of claim 1 wherein the aqueous hydrogen chloride solution provided in step (d) contains at least about 10 percent, by weight, of hydrogen chloride.

3. The process of claim 2 wherein the remaining stream in step (d) is cooled to a temperature which is about 25°F. to about −25°F.

4. The process of claim 1 wherein said cooling of step (d) is effected by passing said remaining stream and added hydrogen chloride from step (c) downwardly through a cooling zone.

5. The process of claim 4 wherein the cooling in step (d) is effected to a temperature which is at about 25°F. to about −25°F. and said aqueous hydrogen chloride solution contains at least about 10 percent, by weight, of hydrogen chloride.

6. The process of claim 1 and further comprising recovering aqueous hydrogen chloride from step (d), concentrating the aqueous hydrogen chloride to produce an aqueous hydrogen chloride having a hydrogen chloride concentration of at least about 20 weight percent and employing said aqueous hydrogen chloride having a concentration of at least 20 weight percent in step (c).

7. In an oxychlorination process to produce a gaseous effluent comprising chlorinated hydrocarbon and water, an improved process for recovering chlorinated hydrocarbon, comprising:
   a. cooling said gaseous effluent to a temperature above the freezing point of water to condense water and a major portion of the chlorinated hydrocarbon;
   b. separating the condensed portion from the remaining gaseous stream;
   c. adding hydrogen chloride to said remaining gaseous stream in an amount sufficient to provide in step (d) an aqueous hydrogen chloride solution which is above its freezing point at the temperature of step (d); and
   d. cooling the remaining stream from step (c) to a temperature from about 25°F. to about −25°F., said cooling condensing further chlorinated hydrocarbon and water, said condensed water combining with the added hydrogen chloride to provide an aqueous hydrogen chloride solution having a freezing point below said cooling temperature.

8. The process of claim 7 wherein the cooling of step (d) is effected by passing said remaining stream and added hydrogen chloride from step (c) downwardly through a cooling zone.

9. The process of claim 7 wherein the hydrogen chloride added in step (c) is anhydrous hydrogen chloride.

10. The process of claim 9 wherein the chlorinated hydrocarbon is 1,2-dichloroethane.

11. The process of claim 10 wherein the cooling in step (d) is to a temperature from about 0°F. to about −25°F. and the hydrogen chloride is added in step (c) to provide an aqueous hydrogen chloride solution in step (d) having from about 15 percent to about 25 percent, by weight, hydrogen chloride.

* * * * *